(12) United States Patent
Moritsugu et al.

(10) Patent No.: US 11,274,233 B2
(45) Date of Patent: Mar. 15, 2022

(54) TWO-COMPONENT ADHESIVE

(71) Applicant: EMULSION TECHNOLOGY CO., LTD., Yokkaichi (JP)

(72) Inventors: Masaki Moritsugu, Mie (JP); Reina Kishimoto, Mie (JP)

(73) Assignee: EMULSION TECHNOLOGY CO., LTD., Yokkaichi (JP)

( * ) Notice: Subject to any disclaimer, the term of this patent is extended or adjusted under 35 U.S.C. 154(b) by 219 days.

(21) Appl. No.: 16/321,561

(22) PCT Filed: May 22, 2017

(86) PCT No.: PCT/JP2017/019077
§ 371 (c)(1),
(2) Date: Jan. 29, 2019

(87) PCT Pub. No.: WO2018/029938
PCT Pub. Date: Feb. 15, 2018

(65) Prior Publication Data
US 2020/0347275 A1  Nov. 5, 2020

(30) Foreign Application Priority Data
Aug. 9, 2016 (JP) .............................. JP2016-157044

(51) Int. Cl.
*C09J 11/04* (2006.01)
*C09J 4/00* (2006.01)
*C09J 175/04* (2006.01)
*C08K 3/34* (2006.01)

(52) U.S. Cl.
CPC ................. *C09J 11/04* (2013.01); *C09J 4/00* (2013.01); *C09J 175/04* (2013.01); *C08K 3/34* (2013.01)

(58) Field of Classification Search
CPC ...... C08F 4/52; C09J 11/04; C09J 4/00; C09J 175/04; C08K 3/36
See application file for complete search history.

(56) References Cited

U.S. PATENT DOCUMENTS

| 5,686,544 | A | * | 11/1997 | Pocius | ................. | C08G 18/168 526/196 |
| 5,872,197 | A | | 2/1999 | Deviny | | |
| 5,990,036 | A | | 11/1999 | Deviny | | |
| 2010/0292384 | A1 | * | 11/2010 | Igarashi | ................ | C09J 175/04 524/425 |
| 2011/0104508 | A1 | * | 5/2011 | Wang | ........................ | C09J 4/06 428/522 |

FOREIGN PATENT DOCUMENTS

| CN | 1192756 A | 9/1998 | |
| CN | 1192769 A | 9/1998 | |
| CN | 101874092 A | 10/2010 | |
| DE | 4412759 A1 * | 10/1995 | ............... C08K 3/36 |
| JP | 11-512123 A | 10/1999 | |
| JP | 11-512123 A5 | 10/1999 | |
| WO | WO 97/07171 A1 | 2/1997 | |
| WO | WO 2012/160452 A1 | 11/2012 | |

OTHER PUBLICATIONS

Dow (Dow TONE 0305 Polyol, MatWeb Material Property Data, 2021, 2 pages).*
Derwent Abstract of DE 4112759 (1995, 2 pages).*
International Search Report dated Jul. 4, 2017 in PCT/JP2017/019077, citing documents AA, AB, and AO-AQ therein, 5 pages (with English translation).
Written Opinion of the International Searching Authority dated Jul. 4, 2017 in PCT/JP2017/019077, citing documents AA, AB, and AO-AQ therein, 7 pages (with English translation).
Combined Chinese Office Action and Search Report dated Nov. 27, 2020 in corresponding Chinese Patent Application No. 201780047811.9 (with English Translation) citing documents AO and AP therein, 14 pages.
Korean Office Action dated Jan. 15, 2021 in Korean Patent Application No. 10-2019-7003466 (with English translation), 5 pages.
Office Action dated Jun. 8, 2021 in corresponding Chinese Patent Application No. 201780047811.9, citing document AO therein (with English Translation).
Office Action dated Dec. 15, 2021 in corresponding Chinese Patent Application No. 201780047811.9, 9 pages (with English Translation).

\* cited by examiner

*Primary Examiner* — Brieann R Johnston
(74) *Attorney, Agent, or Firm* — Oblon, McClelland, Maier & Neustadt, L.L.P.

(57) ABSTRACT

Provided is a two-component adhesive that includes a first composition and a second composition, in which the first composition contains: a complex derived from an organoborane and a first compound having a first group capable of undergoing an addition reaction to an isocyanate group; and as a diluent, a second compound not having a polymerizable group, the second composition containing: a third compound having an isocyanate group and a polymerizable group; and a dehydrating agent. The first composition preferably does not substantially contain a compound having a polymerizable group.

19 Claims, No Drawings

TWO-COMPONENT ADHESIVE

TECHNICAL FIELD

The present invention relates to a two-component adhesive.

BACKGROUND ART

In order to address environmental problems in recent years, reduction in weight of automobiles and the like has been demanded, and thus resinous materials are extensively used. The resinous material requires an adhesive used for joining of resinous materials with one another, or for joining with a material of a different type such as metal. However, among the resinous materials, polypropylenes that are superior in terms of recyclability and costs are materials involving difficulties in adhesion by means of adhesives.

As a material that enables adhesion of such a hardly adhesive material in recent years, an adhesive in which an organoborane complex is used has been investigated (see, Japanese Unexamined Patent Application (Translation of PCT Application), Publication No. H11-512123 and PCT International Publication No. 2012/160452). In this adhesive: one composition contains a complex derived from the organoborane and a compound having a group capable of undergoing an addition reaction to an isocyanate group; and other composition contains a compound having an isocyanate group and a polymerizable group. According to the adhesive, through mixing two compositions upon the adhesion, the compound having a group capable of undergoing an addition reaction to an isocyanate group reacts with the compound having an isocyanate group and a polymerizable group. Thus, the organoborane having an ability of initiating radical polymerization is released, thereby enabling an adhesive component to be hardened and adhered. In this case, since a radical generated from the released organoborane and oxygen molecules can modify of the surface of a hardly adhesive material such as polypropylene, superior adhesiveness is reportedly attained even when a plasma treatment or the like is not carried out.

PRIOR ART DOCUMENTS

Patent Documents

Patent Document 1: Japanese Unexamined Patent Application (Translation of PCT Application), Publication No. H11-512123
Patent Document 2: PCT International Publication No. 2012/160452

SUMMARY OF THE INVENTION

Problems to be Solved by the Invention

However, the conventional adhesive is inferior in storage stability, which may result from a time-dependent disappearance of the compound having an isocyanate group and a polymerizable group contained in the other composition through deterioration or the like, consequently leading to a disadvantage of still insufficient adhesion strength of the adhesive for meeting demands in the market.

The present invention was made in view of the foregoing circumstances, and an object of the invention is to provide a two-component adhesive superior in storage stability and adhesion strength.

Means for Solving the Problems

According to an aspect of the invention made for solving the aforementioned problems, a two-component adhesive comprises a first composition (hereinafter, may be also referred to as "composition (I)") and a second composition (hereinafter, may be also referred to as "composition (II)"), wherein the composition (I) comprises: a complex (hereinafter, may be also referred to as "(A) complex" or "complex (A)") derived from the organoborane and a first compound (hereinafter, may be also referred to as "compound (a)") having a first group (hereinafter, may be also referred to as "group (X)") capable of undergoing an addition reaction to an isocyanate group; and as a diluent, a second compound not having a polymerizable group (hereinafter, may be also referred to as "(B) compound" or "compound (B)"), and the composition (II) comprises: a third compound (hereinafter, may be also referred to as "(C) compound" or "compound (C)") having an isocyanate group and a polymerizable group; and a dehydrating agent (hereinafter, may be also referred to as "(D) dehydrating agent" or "dehydrating agent (D)").

Effects of the Invention

The two-component adhesive of the aspect of the present invention enables superior adhesion strength to be provided while achieving superior storage stability. Therefore, the two-component adhesive can be suitably used for adhesion of a variety of materials including hardly adhesive materials such as outer panels for automobiles.

DESCRIPTION OF EMBODIMENTS

Two-Component Adhesive
The two-component adhesive includes the composition (I) and the composition (II). By mixing the composition (I) and the composition (II), the compound (C) having an isocyanate group and a polymerizable group in the composition (II) reacts with the compound (a) having the group (X) capable of undergoing an addition reaction to the isocyanate group constituting the complex (A) in the composition (I), whereby the two-component adhesive causes a deprotection reaction. As a result, an organoborane, and a reaction product (hereinafter, may be also referred to as "deprotection reaction product (p)") of the compound (a) and the compound (C) are generated. The deprotection reaction product (p) is polymerizable and is capable of polymerizing using the generated organoborane as a polymerization initiator, for example, and further forms a bond, etc., with an adherend via, for example, a radical formed from the organoborane, whereby adhesion proceeds.

The two-component adhesive is superior in storage stability and adhesion strength due to including: the composition (I) containing the complex (A) and the compound (B); and the composition (II) containing the compound (C) and the dehydrating agent (D). Although not necessarily clarified, the reason for achieving the effects described above due to the two-component adhesive having the constitution described above may be presumed, for example, as in the following. In conventional two-component adhesives, the isocyanate group in the compound (C) having an isocyanate group and a polymerizable group is likely to react with the moisture coming from the air and the like, and would disappear with time. Additionally, in a case in which the composition (I) contains a polymerizable compound, etc., a polymerizable group etc., of the polymerizable compound reacts with the group (X) of the compound (a), leading to disappearance with time of the complex (A) through deterioration. It is consequently considered that the storage stability is impaired because of time-dependent lowering of the production speed of the organoborane through a reaction between the compound (C) and the compound (a) having the group (X) capable of undergoing an addition reaction to the isocyanate group constituting the complex (A). According to the present invention, disappearance of the isocyanate group is inhibited by including the dehydrating agent (D) in the composition (II), and furthermore, dilution in the composition (I), of the complex (A) with the compound (B) not having a polymerizable group enables the deterioration thereof over time to be inhibited. Thus the storage stability is considered to be improved.

In addition to the composition (I) and the composition (II), the two-component adhesive may further include other composition(s) not containing the complex (A) or compound (C) to provide a multi-component adhesive including three or more compositions.

The composition (I) and the composition (II) are described below.

Composition (I)

The composition (I) contains the complex (A) and the compound (B). In addition, the composition (I) may contain other component(s) in addition to the components (A) and (B), within a range not leading to impairment of the effects of the present invention. The composition (I) may contain a compound having one polymerizable group (hereinafter, may be also referred to as "(E) polymerizable compound" or "polymerizable compound (E)"), (F) a polymer component and the like described later in the section "Composition (II)"; however, it is preferred that the composition (I) does not substantially contain a compound having a polymerizable group that is capable of reacting the compound (a) constituting the complex (A) to impair the storage stability of the two-component adhesive. The polymerizable compound (E) and the polymer component (F) each have a polymerizable group, etc., and thus it is preferred that the composition (I) does not substantially contain these components. Each component is described below.

(A) Complex

The complex (A) is derived from an organoborane and the compound (a). The compound (a) has the group (X) capable of undergoing an addition reaction to the isocyanate group. The complex (A) is typically formed by coordinate bonding, etc., of the group (X) of the compound (a) to the organoborane, and the compound (a) inhibits the ability of initiating the polymerization of the organoborane. The organoborane can form the complex (A) through interacting with one or a plurality of compounds (a).

Organoborane

The organoborane is a compound obtained from borane by substituting a hydrogen atom with an organic group. The "organic group" as referred to herein means a group that includes at least one carbon atom. The organoborane is exemplified by a compound represented by the following formula (1), and the like.

(1)

In the above formula (1), $R^1$, $R^2$ and $R^3$ each independently represent a monovalent organic group having 1 to 20 carbon atoms.

The monovalent organic group having 1 to 20 carbon atoms represented by $R^1$, $R^2$ or $R^3$ is exemplified by: a monovalent hydrocarbon group having 1 to 20 carbon atoms; a group (α) that includes a divalent hetero atom-containing group between two adjacent carbon atoms of the hydrocarbon group; a group obtained from the hydrocarbon group and group (α) by substituting a part or all of hydrogen atoms with a monovalent hetero atom-containing group; and the like.

Exemplary monovalent hydrocarbon groups having 1 to 20 carbon atoms include a monovalent chain hydrocarbon group having 1 to 20 carbon atoms, a monovalent alicyclic hydrocarbon group having 3 to 20 carbon atoms, a monovalent aromatic hydrocarbon group having 6 to 20 carbon atoms, and the like.

Examples of the monovalent chain hydrocarbon group having 1 to 20 carbon atoms include:

alkyl groups such as a methyl group, an ethyl group, a propyl group and a butyl group;

alkenyl groups such as an ethenyl group, a propenyl group and a butenyl group;

alkynyl groups such as an ethynyl group, a propynyl group and a butynyl group; and the like.

Examples of the monovalent alicyclic hydrocarbon group having 3 to 20 carbon atoms include:

cycloalkyl groups such as a cyclopropyl group, a cyclobutyl group, a cyclopentyl group, a cyclohexyl group, a norbornyl group, an adamantyl group and a tricyclodecyl group;

cycloalkenyl groups such as a cyclopentenyl group, a cyclohexenyl group, a norbornenyl group and a tricyclodecenyl group; and the like.

Examples of the monovalent aromatic hydrocarbon group having 6 to 20 carbon atoms include:

aryl groups such as a phenyl group, a tolyl group, a xylyl group, a naphthyl group and an anthryl group;

aralkyl groups such as a benzyl group, a phenethyl group and a naphthylmethyl group; and the like.

Examples of the hetero atom that may be contained in the monovalent and divalent hetero atom-containing groups include an oxygen atom, a nitrogen atom, a sulfur atom, a phosphorus atom, a silicon atom, and the like.

Examples of the divalent hetero atom-containing group include —O—, —CO—, —NR'—, —S—, —CS—, —SO—, —SO$_2$—, —POR'$_2$—, —SiR'$_2$—, a group obtained by combining the same, and the like. R' represents a monovalent hydrocarbon group having 1 to 10 carbon atoms.

Examples of the monovalent hetero atom-containing group include —OH, —COOH, —NH$_2$, —CN, —NO$_2$, —SH, and the like.

The organoborane is, in light of superior ability of initiating polymerization as well as stability and availability, preferably a compound represented by the above formula (1), wherein $R^1$ to $R^3$ each represent a hydrocarbon group, more preferably a trialkylborane, still more preferably trimethylborane, triethylborane, tripropylborane or tributylborane, and particularly preferably triethylborane.

Compound (a)

The compound (a) has the group (X). The group (X) is capable of undergoing an addition reaction to isocyanate. Upon mixing the composition (I) and the composition (II), the compound (a) reacts with the isocyanate group included in the compound (C) contained in the composition (II).

The group (X) is exemplified by a group having active hydrogen that is capable of bonding to a hetero atom (hereinafter, may be also referred to as "group (X1)"), and the like. Examples of such a hetero atom include a nitrogen atom, an oxygen atom, a sulfur atom, a phosphorus atom, and the like.

Examples of the group (X1) include:

an amino group ($-NH_2$) and a monosubstituted amino group (being derived from $-NH_2$ by substituting one hydrogen atom with a hydrocarbon group), as a group having an active hydrogen capable of bonding to a nitrogen atom;

a hydroxy group as a group having an active hydrogen capable of bonding to an oxygen atom;

a sulfanyl group as a group having an active hydrogen capable of bonding to a sulfur atom;

a phosphino group ($-PH_2$) and a monosubstituted phosphino group (being derived from $-PH_2$ by substituting one hydrogen atom with a hydrocarbon group), as a group having an active hydrogen capable of bonding to a phosphorus atom; and the like.

Examples of the compound having an amino group include:

monoamines such as methylamine, ethylamine, propylamine, butylamine, aniline, ethanolamine, cyclopentylamine and cyclohexylamine;

diamines such as 1,2-diaminoethane, 1,2-diaminopropane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 4,4'-diaminodiphenyl methane, 4,4'-diaminodiphenyl ether, 4,4'-diaminobenzophenone, 2,2-bis (4-aminophenyl)propane, 2-(3-aminophenyl)-2-(4-aminophenyl)propane, 1,4-bis[1-(4-aminophenyl)-1-methylethyl]benzene, 1,3-bis[1-(4-aminophenyl)-1-methylethyl]benzene, 4,7,10-trioxatridecane-1,13-diamine, 4,9-dioxadodecane-1,12-diamine and 3,6,9-trioxaundecane-1,11-diamine;

triamines such as 1,2,3-triaminopropane, 1,2,4-triaminobutane, 1,3,5-triaminocyclohexane and 1,3,5-triaminobenzene; and the like.

Examples of the compound having a monosubstituted amino group include dimethylamine, diethylamine, dipropylamine, dibutylamine, dicyclopentylamine, dicyclohexylamine, N,N'-dimethyl-1,3-diaminopropane, N,N,N',N'-tetramethyl-1,3-diaminopropane, diethanolamine, and the like.

Examples of the compound having a hydroxy group include:

monohydric alcohols such as methanol and ethanol;

diols such as ethylene glycol, 1,4-butanediol and 1,2-cyclohexanediol;

triols such as glycerin and trimethylolpropane; and the like.

Examples of the compound having a sulfanyl group include:

monothiols such as mercaptan and ethanethiol;

dithiols such as ethanedithiol and butanedithiol; and the like.

Examples of the compound having a phosphino group include:

monophosphines such as ethylphosphine and butylphosphine;

diphosphines such as diphosphinoethane and diphosphinobutane; and the like.

Examples of the compound having a monosubstituted phosphino group include diethylphosphine, dibutylphosphine, and the like.

The number of the group (X) included in the compound (a) may be either one, or two or more, and is preferably two or more, more preferably two to four, still more preferably two or three, and particularly preferably two. When the number of the group (X) falls within the above range, a deprotection reaction product (p) having a plurality of polymerization sites is formed from the compound (a) and the compound (C), consequently leading to an improvement of the hardening speed, whereas enhancement of the adhesion strength is enabled due to the resulting polymer having a three-dimensional cross-linked structure.

The group (X) is, in light of facilitation of the deprotection reaction and more enhancement of the adhesion strength, preferably an amino group, a monosubstituted amino group, a sulfanyl group, a phosphino group or a monosubstituted phosphino group, more preferably an amino group or a monosubstituted amino group, and still more preferably an amino group.

The compound (a) is, in light of more facilitation of the deprotection reaction with the compound (C), and further enhancement of the adhesion strength, preferably a compound having an amino group, more preferably a diamine or a triamine, still more preferably a diamine, further particularly preferably a diaminoalkane having 2 to 4 carbon atoms, and most preferably 1,3-aminopropane.

The lower limit of the molar ratio of the compound (a) to the organoborane in the complex (A) is preferably 0.5, more preferably 0.7, still more preferably 0.9, particularly preferably 1, more particularly preferably 1.8, still particularly preferably 2.5, and most preferably 3.5. The upper limit of the molar ratio is preferably 8, more preferably 7, still more preferably 6, and particularly preferably 5.5. When the molar ratio falls within the above range, a more improvement of the stability of the complex (A) is enabled, and as a result, a more improvement of the storage stability of the two-component adhesive is enabled.

The lower limit of the molar ratio of the compound (a) to the organoborane used in preparing the composition (1) is preferably 0.5, more preferably 0.7, still more preferably 0.9, particularly preferably 1, more particularly preferably 1.8, further particularly preferably 2.5, and most preferably 3.5. The upper limit of the molar ratio is preferably 8, more preferably 7, still more preferably 6, and particularly preferably 5.5. When the molar ratio falls within the above range, a more improvement of the stability of the complex (A) is enabled, and as a result, a more improvement of the storage stability of the two-component adhesive is enabled.

The lower limit of the content of the complex (A) in the composition (I) is, in light of more enhancement of the adhesion strength of the two-component adhesive, preferably 0.1% by mass, more preferably 1% by mass, still more preferably 5% by mass, and particularly preferably 10% by mass. The upper limit of the content is, in light of ease in handling of the two-component adhesive, preferably 70% by mass, more preferably 50% by mass, still more preferably 40% by mass, and particularly preferably 30% by mass. One, or two or more types of the complex (A) may be used.

(B) Compound

The compound (B) is a compound not having a polymerizable group as a diluent. In other words, the compound (B) is a component for diluting the complex (A) in the composition (I). Due to not having the polymerizable group, a reaction of the compound (B) with the compound (a) in the complex (A) is inhibited, and as a result, the storage stability in the composition (I) can be maintained.

The lower limit of the content of the compound (B) in the composition (I) is preferably 30% by mass, more preferably 50% by mass, still more preferably 60% by mass, and particularly preferably 70% by mass. The upper limit of the content is preferably 99.9% by mass, more preferably 99% by mass, still more preferably 95% by mass, and particularly preferably 90% by mass.

The lower limit of the mass ratio of the compound (B) to the complex (A) is preferably 0.5, more preferably 1, still more preferably 1.5, and particularly preferably 2. The upper limit of the mass ratio is preferably 100, more preferably 10, and still more preferably 5.

The compound (B) is not particularly limited and any compound may be used as long as it does not have a polymerizable group. The compound (B) is exemplified by a hydrocarbon compound, a compound having a polar group, and the like. Moreover, the compound (B) may be any one of a low molecular weight compound, an oligomer and a polymer.

Examples of the hydrocarbon compound include alkanes, olefin oligomers, polyolefins, and the like.

Exemplary compound having a polar group includes: a compound having a polar group between two adjacent carbon atoms at one or a plurality of sites of the aforementioned hydrocarbon compound; a compound obtained from the aforementioned hydrocarbon compound by substituting one or a plurality of hydrogen atoms with a polar group; and the like.

The polar group is exemplified by a group having a hetero atom, and the like. Examples of the hetero atom include an oxygen atom, a nitrogen atom, a sulfur atom, a phosphorus atom, a silicon atom, a halogen atom, and the like.

Examples of the polar group having a hetero atom include:
oxygen atom-containing groups such as a hydroxy group, an alkoxy group, an acyl group, an ether group and a carbonyl group;
nitrogen atom-containing groups such as an amino group, a substituted amino group and an imino group;
sulfur atom-containing groups such as a sulfanyl group, an alkyl sulfanyl group and a sulfanediyl group;
phosphorus atom-containing groups such as a phosphino group and a substituted phosphino group;
silicon atom-containing groups such as a silyl group and a substituted silyl group;
groups containing a halogen atom such as a fluorine atom, a chlorine atom, a bromine atom or an iodine atom; and the like.

The compound (B) is, in light of solubility of the complex (A) and stabilization of the complex (A), preferably the compound having a polar group, more preferably the compound having an oxygen atom-containing group, and still more preferably the compound having a hydroxy group. In a case in which the compound (B) is the compound having a hydroxy group, an addition reaction of the compound (B) to the isocyanate group of the compound (C) is allowed upon mixing of the composition (I) and the composition (II), thereby enabling the compound (B) to be incorporated into the polymer in the adhesion layer. As a result, the strength of the adhesion layer is more enhanced, and thus more enhancement of the adhesion strength is enabled. Additionally, in this case, the addition reaction of the compound (B) to the isocyanate group of the compound (C) is permitted to form a carbamate group (—NH—CO—O—), and as a result, an improvement of flexibility of the adhesion layer is enabled.

The number of the hydroxy group included in the compound having a hydroxy group may be one, leading to a monool compound, or may be two or more, leading to a polyol compound. The compound having a hydroxy group is preferably a polyol compound, in light of possible incorporation of the compound (B) into the main chain of the polymer in the adhesion layer, consequently leading to further enhancement of the strength of the adhesion layer, thereby enabling further enhancement of the adhesion strength. The lower limit of the number of the hydroxy group contained in the polyol compound is preferably 2, and more preferably 3. The upper limit of the number of the hydroxy group may be, for example, 20.

Examples of the polyol compound include:
alkanediols such as ethylene glycol, propylene glycol and 2-butyl-2-ethyl-1,3-propanediol;
alkanetriols such as 1,2,4-butanetriol and trimethylolpropane;
alkanetetraols such as pentaerythritol;
polyalkylene glycols such as polyethylene glycol, polypropylene glycol and polytetramethylene glycol;
polyalkylene glycol-containing polyols such as a double-end ethylene glycol adduct of polypropylene glycol represented by the following formula (B-1), and a double-end ethylene glycol adduct of polytetramethylene glycol;
bisphenol-containing polyols such as propylene glycol adduct of bisphenol A represented by the following formula (B-2), and ethylene glycol adduct of bisphenol A;
polyester polyols such as polycaprolactonediol and polycaprolactonetriol;
polycarbonate polyols such as polycarbonate diol and polycarbonate polyol; and the like.

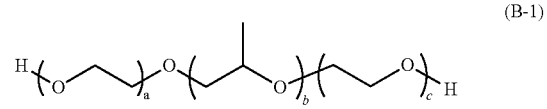

(B-1)

In the above formula (B-1), a, b and c are each independently an integer of 1 to 200.

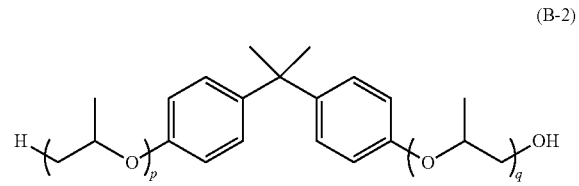

(B-2)

In the above formula (B-2), p and q are each independently an integer of 1 to 200.

Examples of commercially available products of the propylene glycol adduct of bisphenol A include NEWPOL BP-2P, NEWPOL BP-23P, NEWPOL BP-3P, NEWPOL BP-5P (Sanyo Chemical Industries, Ltd.), and the like. Examples of commercially available products of the ethylene glycol adduct of bisphenol A include NEWPOL BPR-20NK, NEWPOL BPE-20T, NEWPOL BPE-40, NEWPOL BPE-60, NEWPOL BPE-100, NEWPOL BPE-180 (Sanyo Chemical Industries, Ltd.), and the like.

In a case in which the compound (B) is the compound having a hydroxy group, and the compound (a) is the compound having an amino group, the lower limit of the number of moles of the isocyanate group in the compound (C) to the ratio of the total number of moles of the hydroxy group in the compound (B) and the amino group in the compound (a) is preferably 0.5, more preferably 1, and still more preferably 1.5. The upper limit of this ratio may be, for example, 10. When the ratio falls within the above range, the compound (B) is effectively incorporated into the polymer in the adhesion layer, thereby leading to further enhancement of the strength of the adhesion layer, and consequently, further enhancement of the adhesion strength is enabled.

The lower limit of the molecular weight of the compound (B) is, in light of more enhancement of the strength of the adhesion layer, preferably 100, more preferably 300, still more preferably 500, and particularly preferably 1,000. The upper limit of the molecular weight is preferably 10,000, more preferably 8,000, even more preferably 6,000, and still more preferably 5,000. In a case in which the compound (B) is an oligomer or the like, having been accompanied by molecular weight distribution, the molecular weight may be, for example, number average molecular weight. One, or two or more types of the compound (B) may be used.

Other Components

The composition (I) may contain as other component except for the components (A) and (B), for example, a plasticizer, an inorganic filler, a colorant, a metal salt, a polymerization inhibitor and the like. One, or two or more types of these other components may be contained.

Examples of the plasticizer include: phthalic acid esters such as dibutyl phthalate, di(2-ethylhexyl) phthalate and butylbenzyl phthalate; non-aromatic dibasic acid esters such as dioctyl adipate and dioctyl sebacate; benzoic acid esters such as dipropylene glycol dibenzoate and triethylene glycol dibenzoate; and the like.

Examples of the inorganic filler include alumina, silica, titanium dioxide, calcium carbonate, talc, and the like.

Examples of the colorant include carbon black, and the like.

The metal salt may be contained in order to adjust pot life of the two-component adhesive. Examples of the metal salt include copper (II) bromide, copper (II) chloride, copper (II) 2-ethylhexanoate, and the like.

Examples of the polymerization inhibitor include hydroquinone, hydroquinone monomethyl ether, and the like.

Composition (II)

The composition (II) contains the compound (C) and the dehydrating agent (D). The composition (II) contains preferably the polymerizable compound (E) and/or the polymer component (F), and may contain, within a range not leading to impairment of the effects of the present invention, other component(s) except for the components (C) to (F). Each component is described below.

(C) Compound

The compound (C) has an isocyanate group and a polymerizable group. The compound (C) undergoes a deprotection reaction with the compound (a) constituting the complex (A) in the composition (I) to form a deprotection reaction product (p), and the deprotection reaction product (p) is polymerizable. As described above, by mixing the composition (I) and the composition (II) upon use of the two-component adhesive, the group (X) capable of undergoing an addition reaction to the isocyanate group of the compound (a) in the complex (A) reacts to the isocyanate group of the compound (C), whereby the deprotection reaction product (p) and the organoborane are generated. Thus, the adhesion proceeds through polymerization of the deprotection reaction product (p) due to the ability of initiating polymerization of the organoborane.

Examples of the polymerizable group include:

carbon-carbon double bond-containing groups such as a vinyl group, an allyl group, a styryl group and a (meth)acryloyl group;

carbon-carbon triple bond-containing groups such as an ethynyl group and a propargyl group; and the like.

Of these, in light of superior polymerizability and a capability of more improving the hardening speed, the carbon-carbon double bond-containing groups are preferred, and the (meth)acryloyl group is more preferred.

The number of the isocyanate group included in the compound (C) is, in light of more facilitation of the deprotection reaction, preferably 1 to 3, more preferably 1 or 2, and still more preferably 1.

The number of the polymerizable group included in the compound (C) is, in light of a more improvement the polymerization rate of the deprotection reaction product (p) to be formed, preferably 1 to 3, more preferably 1 or 2, and still more preferably 1.

With respect to a combination of the number of the isocyanate group and the number of the polymerizable group each included in the compound (C), a combination of the number of the isocyanate group being 1 and 2 and the number of the polymerizable group being 1 and 2 is preferred, and a combination of the number of the isocyanate group and the number of the polymerizable group both being 1 is preferred.

Examples of the compound (C) include:

aliphatic isocyanates, e.g., isocyanatoalkyl (meth)acrylates such as isocyanatoethyl (meth)acrylate and isocyanatopropyl (meth)acrylate;

alicyclic isocyanates, e.g., isocyanatocycloalkyl (meth)acrylates such as isocyanatocyclohexyl (meth)acrylate and isocyanatonorbornyl (meth)acrylate;

aromatic isocyanates such as styryl isocyanate and isocyanatophenyl (meth)acrylate;

(meth)acrylates having an isocyanate group such as an adduct of diisocyanate and hydroxyalkyl (meth)acrylate;

alkenes having an isocyanate group such as isocyanatobutene, isocyanatopentene and isocyanatohexene; and the like.

It is preferred that in the compound (C), an addition reaction of the group (X) in the compound (a) to the isocyanate group is likely to be caused. Due to the use of such a highly reactive compound (C), the two-component adhesive does not necessitate use of a catalyst for the addition reaction such as an organic tin compound. Such a compound (C) is exemplified by an aliphatic isocyanate, an aromatic isocyanate, and the like.

The compound (C) is preferably an aliphatic isocyanate or an aromatic isocyanate, more preferably an aliphatic isocyanate, still more preferably (meth)acrylate having an isocyanate group, particularly preferably isocyanatoalkyl (meth)acrylate, and further particularly preferably isocyanatoethyl (meth)acrylate.

The lower limit of the content of the compound (C) in the composition (II) is preferably 0.1% by mass, more preferably 1% by mass, still more preferably 3% by mass, and particularly preferably 5% by mass. The upper limit of the content is preferably 40% by mass, more preferably 20% by mass, still more preferably 15% by mass, and particularly preferably 10% by mass. When the content of the compound (C) falls within the above range, a further improvement of the storage stability and further enhancement of the adhesion strength of the two-component adhesive is enabled.

The lower limit of the molar ratio of the isocyanate group of the compound (C) to the group (X) of the compound (a) is preferably 0.5, more preferably 0.7, still more preferably 1, and particularly preferably 1.5. The upper limit of the molar ratio is preferably 6, more preferably 4, still more preferably 3, and particularly preferably 2.5. When the molar ratio falls within the above range, a further improvement of the storage stability and further enhancement of the adhesion strength of the two-component adhesive is enabled.

In a case in which compound (a) is a diamine, the lower limit of the molar ratio of the isocyanate group to the diamine is preferably 1, more preferably 1.3, still more preferably 1.5, and particularly preferably 1.7. The upper limit of the molar ratio is preferably 3, more preferably 2.7, still more preferably 2.5, and particularly preferably 2.3. When the molar ratio falls within the above range, a further improvement of the storage stability and further enhancement of the adhesion strength of the two-component adhesive is enabled. One, or two or more types of the compound (C) may be used.

(D) Dehydrating Agent

The dehydrating agent (D) as referred to herein means a substance that is capable of removing the moisture present in a material. Therefore, due to containing the dehydrating agent (D), the composition (II) enables the moisture to be removed that has been included during storage from outside the system.

The dehydrating agent (D) is exemplified by an inorganic dehydrating agent, an organic dehydrating agent, and the like.

Examples of the inorganic dehydrating agent include:

zeolites such as zeolite 3A, zeolite 4A and zeolite 5A;

anhydrous inorganic salts such as anhydrous calcium chloride, anhydrous sodium sulfate, anhydrous calcium sulfate, anhydrous magnesium chloride, anhydrous magnesium sulfate, anhydrous potassium carbonate, anhydrous potassium sulfide, anhydrous potassium sulfite, anhydrous sodium sulfite and anhydrous copper sulfate;

silica gel, alumina, silica alumina, active white earth, and the like.

Examples of the organic dehydrating agent include:

orthoformic acid esters such as methyl orthoformate, ethyl orthoformate and propyl orthoformate;

orthoacetic acid esters such as methyl orthoacetate, ethyl orthoacetate and propyl orthoacetate;

orthocarboxylic acid esters, e.g., orthopropionic acid esters such as methyl orthopropionate and ethyl orthopropionate;

acetal compounds such as benzaldehydedimethylacetal, acetaldehydedimethylacetal, formaldehydedimethylacetal, acetonedimethylacetal, acetonedibenzylacetal, diethyl ketone dimethylacetal, benzophenonedimethylacetal, benzylphenyl ketone dimethylacetal, cyclohexanonedimethylacetal, acetophenonedimethylacetal, 2,2-dimethoxy-2-phenylacetophenone, 4,4-dimethoxy-2,5-cyclohexadien-1-one acetal and dimethylacetamidediethylacetal;

carbodiimide compounds such as dicyclohexylcarbodiimide and diisopropylcarbodiimide;

silicate compounds such as methyl silicate and ethyl silicate, and the like.

In light of possible more enhancement of the strength of the adhesion layer, consequently leading to possible more enhancement of the adhesion strength, the dehydrating agent (D) is preferably the inorganic dehydrating agent, and more preferably zeolite. Also, among the series of zeolite, in light of a more improvement of the storage stability, zeolite 3 A and zeolite 5 A are preferred, and zeolite 3 A is more preferred.

The lower limit of the content of the dehydrating agent (D) in the composition (II) is preferably 0.1% by mass, more preferably 0.4% by mass, still more preferably 0.8% by mass, particularly preferably 2% by mass, and further particularly preferably 2.5% by mass. The upper limit of the content is preferably 15% by mass, more preferably 11% by mass, still more preferably 8% by mass, and particularly preferably 6% by mass. When the content of the dehydrating agent (D) falls within the above range, the storage stability and the adhesion strength can be both attained in a well-balanced manner.

The lower limit of the mass ratio of the dehydrating agent (D) to the compound (C) is preferably 0.05, more preferably 0.1, still more preferably 0.3, and particularly preferably 0.5. The upper limit of the mass ratio is preferably 2, more preferably 1.5, still more preferably 1, and particularly preferably 0.8. When the mass ratio of the dehydrating agent (D) to the compound (C) falls within the above range, the storage stability and the adhesion strength can be both attained in a well-balanced manner. One, or two or more types of the dehydrating agent (D) may be used.

(E) Polymerizable Compound

The polymerizable compound (E) is a compound having one polymerizable group and not having an isocyanate group. Due to containing the polymerizable compound (E) in the composition (II), the two-component adhesive enables the strength of the adhesion layer to be more enhanced, and consequently enables the adhesion strength to be more enhanced.

Examples of the polymerizable group include:

carbon-carbon double bond-containing groups such as a vinyl group, an allyl group, a styryl group and a (meth) acryloyl group;

carbon-carbon triple bond-containing groups such as an ethynyl group and a propargyl group, and the like. Of these, in light of superior polymerizability, the carbon-carbon double bond-containing group is preferred, and the (meth) acryloyl group is more preferred.

Examples of the polymerizable compound (E) include:

olefins such as butene, pentene, hexene, octene, decene and dodecene;

styrene compounds such as styrene, a-methylstyrene and methylstyrene;

vinyl carboxylates such as vinyl acetate, vinyl propionate and vinyl laurate;

halogenated olefins such as vinyl chloride and vinylidene chloride;

vinyl compounds such as methyl vinyl ketone and methyl vinyl ether;

alkyl (meth)acrylates such as methyl (meth)acrylate, ethyl (meth)acrylate, n-butyl (meth)acrylate, sec-butyl (meth) acrylate, tert-butyl (meth)acrylate and 2-ethylhexyl (meth) acrylate;

(meth)acrylates having an aliphatic ring, e.g., cycloalkyl (meth)acrylates such as cyclopentyl (meth)acrylate, cyclohexyl (meth)acrylate, 4-butylcyclohexyl (meth)acrylate, bornyl (meth)acrylate, isobornyl (meth)acrylate, tricyclodecanyl (meth)acrylate and tetracyclododecanyl (meth)acrylate, as well as cycloalkenyl (meth)acrylates such as cyclopentenyl (meth)acrylate, cyclohexenyl (meth)acrylate and tricyclodecenyl (meth)acrylate;

(meth)acrylates having an aromatic ring, e.g., aryl (meth) acrylates such as phenyl (meth)acrylate and tolyl (meth) acrylate, aralkyl (meth)acrylates such as benzyl (meth)acrylate, as well as aryloxyalkyl (meth)acrylates such as phenoxyethyl (meth)acrylate;

(meth)acrylate compounds, e.g., hetero atom-containing (meth)acrylates such as hydroxyethyl (meth)acrylate, glycidyl (meth)acrylate and tetrahydrofurfuryl (meth)acrylate;

(meth)acrylamide compounds such as (meth)acrylamide and N-methyl(meth)acrylamide;

(meth)acrylonitrile, and the like.

Of these, in light of superior polymerizability, the (meth)acrylate compounds are preferred. Among the (meth)acrylate compounds, in light of reduction in the odor of the two-component adhesive and also in light of dissolution of the polymer component (F) described later, the hetero atom-containing (meth)acrylates are preferred, and tetrahydrofurfuryl (meth)acrylate is more preferred. In light of the flexibility to be imparted to the adhesion layer, the alkyl (meth)acrylates are preferred, and 2-ethylhexyl (meth)acrylate is more preferred. One, or two or more polymerizable compounds (E) may be used.

In a case in which the composition (II) contains the polymerizable compound (E), the lower limit of the content of the polymerizable compound (E) in the composition (II) is preferably 10% by mass, more preferably 30% by mass, still more preferably 40% by mass, and particularly preferably 50% by mass. The upper limit of the content is preferably 90% by mass, more preferably 80% by mass, still more preferably 75% by mass, and particularly preferably 70% by mass. When the content falls within the above range, the strength of the adhesion layer is more improved, and as a result, further enhancement of the adhesion strength is enabled.

(F) Polymer Component

The composition (II) preferably contains the polymer component (F) in light of enhancement of the initial adhesion strength and adjustment of the viscosity of the two-component adhesive, as well as inhibition of contraction through hardening of the adhesion layer, and the like.

The polymer component (F) is not particularly limited as long as it is a polymer, and is exemplified by a polyolefin, a polystyrene, a styrene copolymer, a poly(meth)acrylate, a polydiene, an acrylic copolymer, a thermoplastic elastomer, and the like. Alternatively, an ethylene-vinyl acetate copolymer, an epoxy resin, a phenol resin, a silicone resin, a polyester resin, a urethane resin or the like may be also used. Also, as the polymer component (F), a copolymer having the structure of any of these polymers can be suitably used.

Examples of the polyolefin include polyethylene, polypropylene, ethylene-α-olefin copolymers, and the like.

Examples of the polystyrene include polystyrene, poly(α-methylstyrene), and the like.

Examples of the styrene copolymer include a styrene-methyl methacrylate copolymer, a styrene-acrylate copolymer, a styrene-maleic anhydride copolymer, a styrene-acrylonitrile copolymer, ABS (acrylonitrile-butadiene-styrene copolymer), and the like.

Examples of the poly(meth)acrylate include polymethyl (meth)acrylate, polyethyl (meth)acrylate, polybutyl (meth)acrylate, and the like.

Examples of the polydiene include polybutadiene, polyisoprene, and the like.

Examples of the acrylic copolymer include a polymer having a plurality of types of (meth)acrylic acid ester units, a butyl (meth)acrylate-acrylonitrile copolymer, and the like.

Examples of the thermoplastic elastomer include: conjugated diene copolymers being unhydrogenated such as SBS (styrene-butadiene-styrene block copolymer), SEBS (styrene-ethylene-butadiene-styrene block copolymer), SIS (styrene-isoprene-styrene block copolymer) and SEPS (styrene-ethylene-propylene-styrene block copolymer); hydrogenated products of the same; and the like.

Of these, in light of more appropriate viscosity being provided, the thermoplastic elastomer and the poly(meth)acrylate are preferred, and the thermoplastic elastomer is more preferred.

It is preferred that the polymer component (F) has a polymerization site. When the polymer component (F) has the polymerization site, the polymer component (F) is copolymerized with the deprotection reaction product (p), etc., and as a result, the enhancement of the initial adhesion strength, the adjustment of the viscosity, and the inhibition of contraction through hardening described above can be more effectively executed. The polymerization site is exemplified by: a carbon-carbon double bond in a main chain of the polymer; a polymerizable group included in a side chain or end of the polymer, and the like. The polymer component (F) having the polymerization site is exemplified by a conjugated diene copolymer being unhydrogenated. Of these, in light of more appropriate viscosity being provided, SBS is preferred.

The polymer component (F) may be polymer particles, or a polymer not forming particles. It is preferred that the composition (II) contains polymer particles as the polymer component (F). When the composition (II) contains the polymer particles, the two-component adhesive enables the flexibility of the adhesion layer to be more improved. Additionally, it is more preferred that the composition (II) contains as the polymer component (F), polymer particles and the polymer not forming particles. When the composition (II) contains both the polymer particles and the polymer not forming particles, the two-component adhesive enables the flexibility of the adhesion layer to be further improved.

The polymer component (F) forming the polymer particles is preferably the polyolefin, the polystyrene, the styrene copolymer, the poly(meth)acrylate, the polydiene, the acrylic copolymer, or a copolymer having the structure of any of these polymers, and more preferably the polystyrene, the poly(meth)acrylate, the polydiene or the copolymer having the structure of any of these polymers.

The lower limit of the average particle diameter of the polymer particles is preferably 0.005 µm, more preferably 0.01 µm, still more preferably 0.05 µm, and particularly preferably 0.1 µm. The upper limit of the average particle diameter is preferably 1 µm, more preferably 0.8 µm, still more preferably 0.6 µm, and particularly preferably 0.4 µm.

Examples of the polymer particles include simple particles, particles having a core-shell structure (core-shell particles), and the like. Of these, the core-shell particles are preferred. When the core-shell particles are used as the polymer particles, the two-component adhesive enables the flexibility of the adhesion layer to be further improved. Examples of commercially available products of such core-shell particles include "Kaneace M-511", "Kaneace M-521", "Kaneace M-570" and "Kaneace M-711" available from Kaneka Corporation, "FX602P" and "FX501" available from JSR Corporation, "ZEON F351" available from Nippon ZEON Co., Ltd., and the like.

In a case in which the polymer particles are contained as the polymer component (F), the lower limit of the percentage content of the polymer particles in the polymer component (F) is preferably 10% by mass, more preferably 15% by mass, still more preferably 20% by mass, and particularly preferably 25% by mass. The upper limit of the percentage content of the polymer particles is preferably 70% by mass, more preferably 60% by mass, still more preferably 50% by mass, and particularly preferably 45% by mass. When the percentage content of the polymer particles falls within the above range, the two-component adhesive enables both the flexibility and adhesion strength of the adhesion layer to be enhanced.

The polymer component (F) not forming particles is preferably the styrene copolymer, the poly(meth)acrylate, the polydiene, the thermoplastic elastomer, the silicone resin, the polyester resin or the urethane resin, more preferably the thermoplastic elastomer, and still more preferably SBS.

In a case in which the composition (II) contains the polymer component (F), the lower limit of the content of the polymer component (F) in the composition (II) is preferably 1% by mass, more preferably 5% by mass, still more preferably 8% by mass, and particularly preferably 10% by mass. The upper limit of the content is preferably 60% by mass, more preferably 45% by mass, still more preferably 35% by mass, and particularly preferably 30% by mass. When the content of the polymer component (F) falls within the above range, the enhancement of the initial adhesion strength and the adjustment of the viscosity, as well as the inhibition of contraction through hardening of the adhesion layer, and the like, can be more effectively executed.

Other Components

The composition (IT) may contain as other component except for the components (C) to (F), for example, a crosslinkable compound, a plasticizer, an inorganic filler, a colorant, a metal salt, a polymerization inhibitor, and the like. One, or two or more types of these other components may be each contained.

Crosslinkable Compound

The crosslinkable compound is a compound having two or more polymerizable groups and not having an isocyanate group. When the composition (II) contains the crosslinkable compound, a degree of extensibility of the adhesion layer can be more increased.

The polymerizable group included in the crosslinkable compound is exemplified by the examples of the polymerizable group which may be included in the polymerizable compound (E), and the like. Of these, in light of possible further enhancement of the adhesion strength, a (meth) acryloyl group is preferred.

The number of the polymerizable group included in the crosslinkable compound is, in light of possible further enhancement of the adhesion strength, preferably 2 to 4, more preferably 2 or 3, and still more preferably 2.

Examples of the crosslinkable compound include:

chain glycol-based crosslinkable compounds such as ethylene glycol di(meth)acrylate and triethylene glycol di(meth)acrylate;

alicyclic glycol-based crosslinkable compounds such as tricyclodecanediyl di(meth)acrylate;

trimethylolpropane-based crosslinkable compounds such as trimethylolpropane tri(meth)acrylate;

bisphenol-based crosslinkable compounds such as bisphenol A (bis(polyethylene glycol (meth)acrylate);

imide type isocyanurate-based crosslinkable compounds such as tri(N-hydroxyethyl)isocyanurate di(meth)acrylate;

urethane-based crosslinkable compounds such as a compound represented by the following formula (2);

end bismaleimide-modified polyimide-based crosslinkable compounds such as a compound represented by the following formula (3); and the like.

In the above formula (2), m is an integer of 1 to 20.

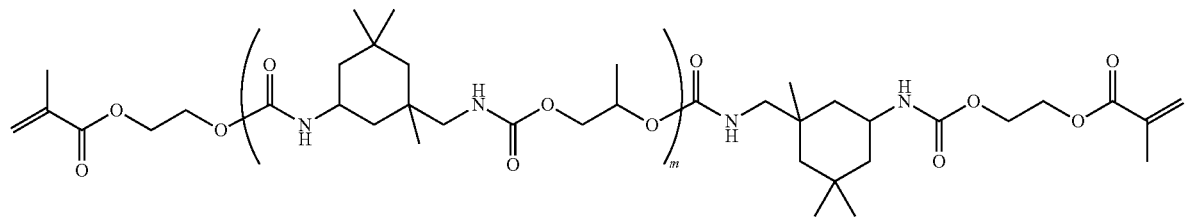

(2)

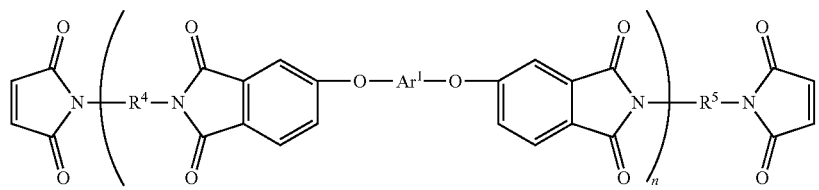

(3)

In the above formula (3), n is an integer of 1 to 20; $R^4$ and $R^5$ each independently represent an alkylene group having 1 to 20 carbon atoms; and $Ar^1$ represents an arylene group having 6 to 20 carbon atoms, wherein in a case in which n is no less than 2, a plurality of $R^4$s may be identical or different, and a plurality of $Ar^1$s may be identical or different.

The crosslinkable compound is preferably the alicyclic glycol-based crosslinkable compound, and more preferably tricyclodecanediyl di(meth)acrylate.

In a case in which the composition (II) contains the crosslinkable compound, the content of the crosslinkable compound in the composition (II) is, in light of more enhancement of the adhesion strength, preferably 0.1% by mass, more preferably 0.5% by mass, and still more preferably 2% by mass. The upper limit of the content is preferably 20% by mass, more preferably 15% by mass, still more preferably 12% by mass, and particularly preferably 10% by mass.

Details and preferred examples of the plasticizer, the inorganic filler, the colorant, the metal salt and the polymerization inhibitor as the other components in the composition (II) are similar to those for the other components in the composition (I).

Preparation Method of Two-Component Adhesive

The two-component adhesive may be obtained by, for example, mixing the complex (A), the compound (B) and as needed, the other component(s) to prepare the composition (I), and separately mixing the compound (C), the dehydrating agent (D), and as needed, the polymerizable compound (E), the polymer component (F) and the other component(s) to prepare the composition (II).

Method of Using Two-Component Adhesive

The two-component adhesive may be used by a well-known method. Upon an adhesion operation, the composition (I) and the composition (II) are mixed first.

The lower limit of the mass ratio of the amount of the composition (II) used to the amount of the composition (I) used is preferably 1, more preferably 3, still more preferably 5, and particularly preferably 9. The upper limit of the mass ratio is preferably 30, more preferably 20, still more preferably 15, and particularly preferably 12. When the mass ratio of each composition used falls within the above range, the amount of the compound (B) used in the two-component adhesive can be more appropriately decreased, and as a result, more enhancement of the adhesion strength is enabled. In addition, the two-component adhesive can be used by a system through discharging with a preexisting or commercially available cartridge, and mixing by means of a static mixer, thereby enabling workability to be more improved.

Next, thus obtained mixture is applied on one adherend, and thereafter other adherend is, for example, closely overlaid on the applied mixture to enable adhesion.

Alternatively, after the aforementioned mixture is applied on both adherends, these applied mixtures may be brought into close contact. Examples of the adherend include: resinous materials such as polypropylene (PP), polyethylene (PE), polyphenylenesulfide (PPS), polyamide 6 (PA6) and polyamide 66 (PA66); metal materials such as stainless steel (SUS), hot-dip galvanized steel (SGHC) and electrodeposited steel (ED); and the like. Of these, the same type or different types of materials may be employed, and thus: adhesion of resinous materials with one another; adhesion of metal materials with one another; and adhesion of the resinous material and the metal material are enabled. The lower limit of the thickness of the adhesion layer formed between both adherends is preferably 0.01 mm, more preferably 0.05 mm, and still more preferably 0.1 mm. The upper limit of the thickness is preferably 5 mm, more preferably 3 mm, and still more preferably 1 mm.

EXAMPLES

Hereinafter, the present invention is explained in detail by way of Examples, but the present invention is not in any way limited to these Examples.

Preparation of Two-Component Adhesive

Each component used for preparing the composition (I) and the composition (II) of the two-component adhesive is shown below.

(A) Complex
TEB-DAP: "TEB-DAP" available from BASF Japan Ltd. (complex derived from triethylborane and diaminopropane)
(B) Compound
BPSP: "NEWPOL BP-5P" available from Sanyo Chemical Industries, Ltd. (hydroxyl value: 211)
(C) Compound
MOI: "Karenz MOI" available from Showa Denko K.K. (2-isocyanatoethyl methacrylate)
(D) Dehydrating Agent
Zeolite 5A: "Molecular sieve 5A" available from Union Showa K.K.
Zeolite 3A: "Molecular sieve 3A" available from Union Showa K.K.
(E) Polymerizable Compound
THFMA: "LIGHT ESTER THF" available from Kyoeisha Chemical Co., Ltd.
2EHMA: "LIGHT ESTER EH" available from Kyoeisha Chemical Co., Ltd.
(F) Polymer Component
SBS: "TR2787" available from J SR Corporation
M521: "Kaneace M-521" available from Kaneka Corporation (core-shell particle)

Example 1: Preparation of Two-Component Adhesive (E-1)

Preparation of Composition (I)
A composition (I-1) was prepared by charging and mixing 2.5 parts by mass of TEB-DAP as the complex (A), and 7.5 parts by mass of BP5P as the compound (B) in a plastic vessel.

Preparation of Composition (II)
In a separable flask equipped with a stirrer, a mixture of 50.5 parts by mass of THFMA as the polymerizable compound (E), and 16.8 parts by mass of SBS and 9.9 parts by mass of M521 as the polymer components (F) was stirred on an oil bath at 40° C. for 3 hrs, whereby SBS was completely dissolved and M521 was homogenously dispersed. Next, 7.6 parts by mass of MOI as the compound (C), 0.5 parts by mass of zeolite 5A as the dehydrating agent (D), and 14.7 parts by mass of 2EHMA as the polymerizable compound (E) were added to the dispersion, and the mixture was further stirred for 1 hour to permit mixing. Then, degassing was carried out under reduced pressure for 2 hrs to prepare a composition (II-1).

Examples 2 to 8 and Comparative Example 1: Preparation of Two-Component Adhesives (E-2) to (E-8) and (CE-1)

Composition (I)
As the composition (I), the composition (I-1) prepared in Example 1 was used.
Composition (II)
Compositions (II-2) to (II-8) and (CII-1) were prepared in a similar manner to the preparation of the composition (11-1) in Example 1 except that each component of the type and content shown in Table 1 below was used. In Table 1, "-" denotes that a corresponding component was not employed.

Comparative Example 2: Preparation of Two-Component Adhesive (CE-2)
Composition (I)
A composition (CI-1) was prepared by charging and mixing 2.5 parts by mass of TEB-DAP as the complex (A), and 7.5 parts by mass of THFMA as the polymerizable compound (E) in a plastic vessel.
Composition (II)
As the composition (II), the composition (II-7) prepared in Example 7 was used.

TABLE 1

| Content (parts by mass) | | | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|---|
| Composition (I) | Two-component adhesive Type | | E-1 | E-2 | E-3 | E-4 | E-5 I-1 | E-6 | E-7 | E-8 | CE-1 | CE-2 CI-1 |
| | (A) Complex | TEB-DAP | | | | | 2.5 | | | | | 2.5 |
| | (B) Compound | BP5P | | | | | 7.5 | | | | | — |
| | (E) Polymerizable compound | THFMA | | | | | — | | | | | 7.5 |
| | Total | | | | | | 10.0 | | | | | 10.0 |
| Composition (II) | Type | | II-1 | II-2 | II-3 | II-4 | II-5 | II-6 | II-7 | II-8 | CII-1 | II-7 |
| | (C) Compound | MOI | 7.6 | 7.6 | 7.6 | 7.6 | 7.6 | 7.6 | 7.6 | 7.6 | 7.6 | 7.6 |
| | (D) Dehydrating agent | Zeolite 5A | 0.5 | 1 | 3 | 5 | 10 | — | — | — | — | — |
| | | Zeolite 3A | — | — | — | — | — | 1 | 3 | 5 | — | 3 |
| | (E) Polymerizable compound | THFMA | 50.5 | 50.2 | 49.0 | 47.9 | 45.2 | 50.2 | 49.0 | 47.9 | 50.7 | 49.0 |
| | | 2EHMA | 14.7 | 14.6 | 14.3 | 14.0 | 13.2 | 14.6 | 14.3 | 14.0 | 14.8 | 14.3 |
| | (F) Polymer component | SBS | 16.8 | 16.7 | 16.4 | 16.0 | 15.1 | 16.7 | 16.4 | 16.0 | 16.9 | 16.4 |
| | | M521 | 9.9 | 9.9 | 9.7 | 9.5 | 8.9 | 9.9 | 9.7 | 9.5 | 10.0 | 9.7 |
| | Total | | 100.0 | 100.0 | 100.0 | 100.0 | 100.0 | 100.0 | 100.0 | 100.0 | 100.0 | 100.0 |

Evaluations

Each two-component adhesive prepared as described above was used to provide a test piece for adhesion strength measurement in accordance with the following method, and the evaluation was made through measuring the adhesion strength (shear strength) in accordance with a shearing test described below.

Measurement of Shear Strength

Test Piece Production Method

Two adherends (each having a length of 2.5 cm and a width of 10 cm) were provided, and immediately before applying the adhesive each thereon, stains on the surface were removed by using a paper wiper ("Kimwipe" available from NIPPON PAPER CRECIA Co., LTD.) soaked with acetone. Next, the composition (I) and the composition (II) were mixed by a bag-mixing procedure. More specifically, the composition (I) and the composition (TI) were each weighed into a polyethylene bag such that a mass ratio of (I):(II) became 1: 10, and the bag was sealed. Thereafter, the bag was rotated for 1 min on the palm for permitting homogenous mixing. Next, a corner of the bag was cut with scissors, and the mixed adhesive was uniformly applied on one adherend at a portion of 1.25-cm square. In order to give a certain thickness of the adhesive, glass beads having a diameter of 0.25 mm were placed to be interposed, and then another adherend was overlaid thereon to produce a test piece.

Shearing Test Method

The tensile shear strength at the adhered portion of the test piece produced as described above was measured by using a tensile tester ("Autograph AG5000B" available from Shimadzu Corporation) in conformity to JIS-K6850. The measurement condition involved: a temperature: 23° C.; a distance between chucks: 110 mm; and a test speed: 5 mm/min.

Adhesion Strength and Storage Stability

The adhesion strength (shear strength) of each of the two-component adhesives of Examples 1 to 8 and Comparative Examples 1 and 2 prepared as described above was measured at storage temperatures of 5° C., 25° C. and 40° C., respectively, for a storage time period of 0 days (immediately after preparation of the composition), 14 days, 30 days, 60 days and 90 days, respectively, in the case of using adherends of: glass fiber-reinforced polypropylene/glass fiber-reinforced polypropylene (GFPP/GFPP); or electrodeposited steel/electrodeposited steel (ED/ED). In addition, the destruction mode was visually evaluated. Each denotation of the destruction mode was A: interface destruction; B: base material destruction; and C: aggregative destruction. The results of the evaluations are each shown in Tables 2 to 11.

The less deterioration in the adhesion strength after the longer storage period in days in spite of the high storage temperature leads to an evaluation that the storage stability of the two-component adhesive is more favorable. The denotation "unhardened" in Table for Example 1, Example 5 and Comparative Example 1 suggests that hardening did not occur even when the composition (I) and the composition (II) were mixed, suggesting unfavorable storage stability. Further, the denotation "CI-1 hardened" in Table for Comparative Example 2 suggests that the composition (CI-1) was hardened alone during the storage, suggesting unfavorable storage stability.

TABLE 2

| | Example 1 | | | | | |
|---|---|---|---|---|---|---|
| Storage temperature | 5° C. | | 25 °C. | | 40° C. | |
| | GFPP | ED | GFPP | ED | GFPP | ED |
| Storage period (days) | value (MPa) / destruction mode | value (MPa) / destruction mode | value (MPa) / destruction mode | value (MPa) / destruction mode | value (MPa) / destruction mode | value (MPa) / destruction mode |
| 0 | 9.0 B | 12.0 C | 9.0 B | 12.0 C | 9.0 B | 12.0 C |
| 14 | 7.7 B | 11.8 C | 7.1 B | 10.9 C | 7.1 C | 9.7 C |

TABLE 2-continued

| | Example 1 | | | | | | | | | | | |
|---|---|---|---|---|---|---|---|---|---|---|---|---|
| Storage temperature | 5° C. | | | | 25 °C. | | | | 40° C. | | | |
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 30 | 7.9 | B | 10.2 | C | 7.5 | B | 8.9 | C | 9.1 | C | 9.5 | C |
| 60 | 8.2 | B | 9.3 | C | 8.9 | B | 10.2 | C | unhardened | | unhardened | |
| 90 | 9.1 | B | 11.4 | C | 8.1 | B | 10.6 | C | unhardened | | unhardened | |

TABLE 3

| | Example 2 | | | | | | | | | | | |
|---|---|---|---|---|---|---|---|---|---|---|---|---|
| Storage temperature | 5° C. | | | | 25 °C. | | | | 40° C. | | | |
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 7.2 | B | 11.9 | C | 7.2 | B | 11.9 | C | 7.2 | B | 11.9 | C |
| 14 | 7.5 | B | 11.8 | C | 7.8 | B | 12.6 | C | 7.6 | B | 9.6 | C |
| 30 | 7.9 | B | 10.8 | C | 7.2 | B | 9.2 | C | 9.2 | B | 10.2 | C |
| 60 | 9.5 | B | 10.2 | C | 8.1 | B | 12.5 | C | 8.2 | B | 8.9 | C |
| 90 | 7.5 | B | 11.8 | C | 8.1 | B | 12.1 | C | 7.5 | B | 9.1 | C |

TABLE 4

| | Example 3 | | | | | | | | | | | |
|---|---|---|---|---|---|---|---|---|---|---|---|---|
| Storage temperature | 5° C. | | | | 25 °C. | | | | 40° C. | | | |
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 7.3 | B | 11.3 | C | 7.3 | B | 11.3 | C | 7.3 | B | 11.3 | C |
| 14 | 7.9 | B | 12.3 | C | 7.7 | B | 12.8 | C | 8.6 | B | 12.0 | C |
| 30 | 7.6 | B | 10.9 | C | 7.5 | B | 9.2 | C | 9.8 | B | 10.9 | C |
| 60 | 7.9 | B | 10.9 | C | 8.2 | B | 9.2 | C | 7.1 | B | 9.5 | C |
| 90 | 7.7 | B | 11.7 | C | 8.3 | B | 11.1 | C | 8.6 | B | 9.9 | C |

TABLE 5

| | Example 4 | | | | | | | | | | | |
|---|---|---|---|---|---|---|---|---|---|---|---|---|
| Storage temperature | 5° C. | | | | 25 °C. | | | | 40° C. | | | |
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 7.1 | B | 12.1 | C | 7.1 | B | 12.1 | C | 7.1 | B | 12.1 | C |
| 14 | 8.6 | B | 9.2 | C | 8.2 | B | 10.3 | C | 6.9 | B | 10.2 | C |
| 30 | 7.6 | B | 9.7 | C | 7.5 | B | 9.8 | C | 7.1 | B | 9.6 | C |
| 60 | 7.1 | B | 10.5 | C | 6.9 | B | 10.1 | C | 6.8 | B | 12.2 | C |
| 90 | 6.7 | B | 11.5 | C | 7.2 | B | 9.6 | C | 7.8 | B | 11.7 | C |

TABLE 6

Example 5

| Storage temperature | 5° C. | | | | 25 °C. | | | | 40° C. | | | |
|---|---|---|---|---|---|---|---|---|---|---|---|---|
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 7.1 | B | 12.1 | C | 7.1 | B | 12.1 | C | 7.1 | B | 12.1 | C |
| 14 | 4.7 | A | 8.8 | C | 2.3 | A | 7.7 | C | 3.3 | A | 6.3 | C |
| 30 | 3.8 | A | 8.5 | C | 2.4 | A | 10.2 | C | 4.3 | C | 6.2 | C |
| 60 | 6.0 | A | 8.2 | C | 4.6 | A | 6.3 | C | 3.2 | A | 7.2 | C |
| 90 | 5.4 | A | 7.1 | C | 6.2 | A | 8.0 | C | unhardened | | unhardened | |

TABLE 7

Example 6

| Storage temperature | 5° C. | | | | 25 °C. | | | | 40° C. | | | |
|---|---|---|---|---|---|---|---|---|---|---|---|---|
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 8.1 | B | 13.1 | C | 8.1 | B | 13.1 | C | 8.1 | B | 13.1 | C |
| 14 | 8.6 | B | 12.8 | C | 8.1 | B | 13.3 | C | 7.9 | B | 10.5 | C |
| 30 | 7.2 | B | 11.5 | C | 8.8 | B | 12.5 | C | 7.5 | B | 11.6 | C |
| 60 | 8.5 | B | 10.8 | C | 8.9 | B | 12.6 | C | 8.6 | B | 13.1 | C |
| 90 | 7.6 | B | 11.5 | C | 8.1 | B | 12.8 | C | 7.9 | B | 9.5 | C |

TABLE 8

Example 7

| Storage temperature | 5° C. | | | | 25 °C. | | | | 40° C. | | | |
|---|---|---|---|---|---|---|---|---|---|---|---|---|
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 7.3 | B | 12.0 | C | 7.3 | B | 12.0 | C | 7.3 | B | 12.0 | C |
| 14 | 9.1 | B | 13.6 | C | 7.2 | B | 13.2 | C | 8.2 | B | 12.1 | C |
| 30 | 9.3 | B | 10.6 | C | 8.6 | B | 11.9 | C | 7.4 | B | 11.3 | C |
| 60 | 8.1 | B | 13.6 | C | 7.9 | B | 12.2 | C | 7.5 | B | 13.6 | C |
| 90 | 7.5 | B | 12.4 | C | 8.0 | B | 11.0 | C | 8.1 | B | 10.0 | C |

TABLE 9

Example 8

| Storage temperature | 5° C. | | | | 25 °C. | | | | 40° C. | | | |
|---|---|---|---|---|---|---|---|---|---|---|---|---|
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 6.9 | B | 11.2 | C | 6.9 | B | 11.2 | C | 6.9 | B | 11.2 | C |
| 14 | 8.3 | B | 13.5 | C | 8.7 | B | 13.7 | C | 8.1 | B | 13.7 | C |
| 30 | 9.1 | B | 12.6 | C | 8.0 | B | 13.4 | C | 8.6 | B | 12.6 | C |
| 60 | 9.4 | B | 13.9 | C | 9.2 | B | 12.9 | C | 8.7 | B | 11.7 | C |
| 90 | 7.9 | B | 12.2 | C | 7.9 | B | 12.8 | C | 8.4 | B | 12.3 | C |

TABLE 10

Comparative Example 1

| Storage temperature | 5° C. | | | | 25 °C. | | | | 40° C. | | | |
| --- | --- | --- | --- | --- | --- | --- | --- | --- | --- | --- | --- | --- |
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 7.6 | B | 9.5 | C | 7.6 | B | 9.5 | C | 7.6 | B | 9.5 | C |
| 14 | 7.5 | B | 9.4 | C | 8.5 | C | 6.6 | C | 5.2 | C | 6.8 | C |
| 30 | 7.2 | B | 9.3 | C | 6.5 | C | 8.8 | C | unhardened | | unhardened | |
| 60 | 8.6 | B | 8.6 | C | 4.8 | C | 5.5 | C | unhardened | | unhardened | |
| 90 | 8.1 | B | 10.2 | C | unhardened | | unhardened | | unhardened | | unhardened | |

TABLE 11

Comparative Example 2

| Storage temperature | 5° C. | | | | 25 °C. | | | | 40° C. | | | |
| --- | --- | --- | --- | --- | --- | --- | --- | --- | --- | --- | --- | --- |
| | GFPP | | ED | | GFPP | | ED | | GFPP | | ED | |
| Storage period (days) | value (MPa) | destruction mode | value (MPa) | destruction mode | value (MPa) | destruction mode | value (MPa) | destruction mode | value (MPa) | destruction mode | value (MPa) | destruction mode |
| 0 | 8.5 | B | 14.1 | C | 8.5 | B | 14.1 | C | 8.5 | B | 14.1 | C |
| 14 | 8.0 | B | 12.9 | C | 7.8 | B | 9.8 | C | CI-1 hardened | | CI-1 hardened | |
| 30 | CI-1 hardened | | CI-1 hardened | | CI-1 hardened | | CI-1 hardened | | CI-1 hardened | | CI-1 hardened | |
| 60 | CI-1 hardened | | CI-1 hardened | | CI-1 hardened | | CI-1 hardened | | CI-1 hardened | | CI-1 hardened | |
| 90 | CI-1 hardened | | CI-1 hardened | | CI-1 hardened | | CI-1 hardened | | CI-1 hardened | | CI-1 hardened | |

The results shown in Tables 2 to 11 suggest that the two-component adhesives of the embodiments of the present invention each obtained by: blending the compound (B) in addition to the complex (A), into the composition (I); and blending the dehydrating agent (D) in addition to the compound (C), into the composition (II), were superior in the storage stability and adhesion strength.

INDUSTRIAL APPLICABILITY

The two-component adhesive of the present invention enables superior adhesion strength to be provided while achieving superior storage stability. Therefore, the two-component adhesive can be suitably used for adhesion of a variety of materials including hardly adhesive materials such as outer panels for automobiles.

The invention claimed is:

1. A two-component adhesive comprising a first composition and a second composition, wherein
    the first composition comprises: a complex derived from a trialkylborane and a first compound comprising a group having an active hydrogen capable of bonding to a nitrogen atom; and a polyol compound, and
    the second composition comprises: a third compound comprising an isocyanate group and a (meth)acryloyl group; and zeolite at a content of 1-5% by mass.

2. The two-component adhesive according to claim 1, wherein the first composition does not substantially comprise a compound comprising a polymerizable group.

3. The two-component adhesive according to claim 1, wherein a mass ratio of the second compound to the complex in the first composition is no less than 0.5.

4. The two-component adhesive according to claim 1, wherein the group in the first compound is an amino group.

5. The two-component adhesive according to claim 1, wherein the second composition further comprises: a compound comprising one polymerizable group and not comprising an isocyanate group; a polymer component; or a combination thereof.

6. The two-component adhesive according to claim 4, wherein a ratio of number of moles of the isocyanate group in the third compound to a total number of moles of the hydroxy group in the polyol compound and the amino group in the first compound is no less than 1.

7. The two-component adhesive according to claim 1, wherein the second composition further comprises:
    at least one compound comprising one polymerizable group and not comprising an isocyanate group; and
    at least one polymer component.

8. The two-component adhesive according to claim 7, wherein the one polymerizable group of the at least one compound in the second composition is a (meth)acryloyl group.

9. The two-component adhesive according to claim 7, wherein the at least one compound in the second composition includes 2-ethylhexyl (meth)acrylate.

10. The two-component adhesive according to claim 1, wherein the second composition further comprises at least one compound comprising one polymerizable group and not comprising an isocyanate group.

11. The two-component adhesive according to claim 10, wherein the one polymerizable group of the at least one compound in the second composition is a (meth)acryloyl group.

12. The two-component adhesive according to claim 10, wherein the at least one compound in the second composition includes 2-ethylhexyl (meth)acrylate.

13. The two-component adhesive according to claim 1, wherein the trialkylborane is one of trimethylborane, triethylborane, tripropylborane and tributylborane.

14. The two-component adhesive according to claim 1, wherein the trialkylborane is triethylborane.

15. The two-component adhesive according to claim 7, wherein the at least one compound in the second composition includes tetrahydrofurfuryl (meth)acrylate.

16. The two-component adhesive according to claim 7, wherein the at least one polymer component in the second composition includes a thermoplastic elastomer.

17. The two-component adhesive according to claim 7, wherein the at least one polymer component in the second composition includes styrene-butadiene-styrene block copolymer.

18. The two-component adhesive according to claim 17, wherein the at least one polymer component in the second composition further includes polymer particles having a core-shell structure.

19. The two-component adhesive according to claim 7, wherein the second composition includes the at least one compound at a content of 50-70% by mass and the at least one polymer component at a content of 10-30% by mass.

* * * * *